(12) United States Patent
Kratimenos

(10) Patent No.: US 12,359,769 B2
(45) Date of Patent: Jul. 15, 2025

(54) SKATEBOARD MOUNT AND SPIN MOUNT

(71) Applicant: Anastasios Kratimenos, Crown Point, IN (US)

(72) Inventor: Anastasios Kratimenos, Crown Point, IN (US)

(*) Notice: Subject to any disclaimer, the term of this patent is extended or adjusted under 35 U.S.C. 154(b) by 0 days.

(21) Appl. No.: 18/496,635

(22) Filed: Oct. 27, 2023

(65) Prior Publication Data

US 2024/0060599 A1 Feb. 22, 2024

(51) Int. Cl.
*F16M 13/02* (2006.01)
*A47F 5/08* (2006.01)
*A63C 17/00* (2006.01)
*F16M 11/04* (2006.01)

(52) U.S. Cl.
CPC ........... *F16M 13/02* (2013.01); *A47F 5/0853* (2013.01); *A63C 17/0006* (2013.01); *F16M 11/04* (2013.01); *A63C 2203/44* (2013.01)

(58) Field of Classification Search
CPC ........ F16M 13/02; F16M 11/04; F16M 11/14; A63C 2203/44; A63C 17/0006; A47F 5/0853
See application file for complete search history.

(56) References Cited

U.S. PATENT DOCUMENTS

| | | | | |
|---|---|---|---|---|
| 5,120,012 A * | 6/1992 | Rosenau | ................ | F16M 13/02 211/89.01 |
| 5,826,908 A * | 10/1998 | McBride | .............. | A63C 11/028 280/809 |
| 6,631,813 B1 * | 10/2003 | Walter | .................. | A47F 5/0846 211/90.01 |
| D499,594 S * | 12/2004 | Laitila | ........................... | D6/552 |
| 7,000,878 B2 * | 2/2006 | Lin | .................... | F16M 11/2078 248/276.1 |
| 7,284,671 B1 * | 10/2007 | Doscher | ............... | A47B 81/005 211/32 |
| 7,503,573 B2 * | 3/2009 | Finlaw | ..................... | B62J 50/40 224/454 |
| 7,661,648 B2 * | 2/2010 | Lin | ........................ | F16B 47/00 248/205.5 |
| 7,721,900 B2 * | 5/2010 | Waterman | ............. | A47F 7/0028 211/89.01 |
| 7,950,535 B1 * | 5/2011 | Schmid | .............. | A63C 17/0013 211/85.7 |
| 8,453,853 B1 * | 6/2013 | Adams | ............... | A63C 17/0006 211/180 |

(Continued)

FOREIGN PATENT DOCUMENTS

WO   WO-2016004741 A1 *  1/2016  ............. B60R 11/02

Primary Examiner — Patrick D Hawn
(74) Attorney, Agent, or Firm — Willis Patent Services

(57) ABSTRACT

A quick install skateboard hanging device designed to lower damage to the wall, the skateboard deck, and the graphic design on the skateboard deck. The hanger is configured to allow small adjustments to the positioning after the first installation. Hanger device includes a base, a set of pins, and a set of adhesive or hook and loop strips for attaching the base to the wall. In one embodiment, the device has a cradle and a ball adapter, wherein the ball adapter is attached to the base and the cradle is removably fastened to the ball adapter, the ball adapter is positioned between the base and the cradle, wherein clamps of the cradle are extendable to accommodate skateboard of different sizes.

13 Claims, 16 Drawing Sheets

(56) References Cited

U.S. PATENT DOCUMENTS

| | | | | |
|---|---|---|---|---|
| 8,540,197 | B1* | 9/2013 | Krol | A63C 17/0006 |
| | | | | 211/DIG. 1 |
| 8,727,192 | B2* | 5/2014 | Lai | B62J 50/225 |
| | | | | 248/316.4 |
| 8,939,297 | B2* | 1/2015 | Berman | A63C 5/03 |
| | | | | 211/85.7 |
| 9,016,658 | B2* | 4/2015 | Barnard | F16M 11/40 |
| | | | | 248/688 |
| 9,291,304 | B1* | 3/2016 | Tu | F16M 13/02 |
| 9,448,588 | B2* | 9/2016 | Barnard | F16M 11/14 |
| 9,707,469 | B2* | 7/2017 | Roland | A63C 17/012 |
| D904,173 | S * | 12/2020 | Jin | D8/354 |
| 10,995,898 | B2* | 5/2021 | Joo | G03B 13/36 |
| 11,206,934 | B2* | 12/2021 | Freeborn | A63C 17/017 |
| 2002/0144962 | A1* | 10/2002 | Dettorre | A63C 11/028 |
| | | | | 211/94.01 |
| 2008/0083684 | A1* | 4/2008 | Pfeiffer | A63C 11/028 |
| | | | | 211/85.7 |
| 2008/0217826 | A1* | 9/2008 | Kim | B60R 11/0258 |
| | | | | 269/21 |
| 2012/0006766 | A1* | 1/2012 | Mackay, Jr. | E05B 73/0094 |
| | | | | 211/4 |
| 2013/0048821 | A1* | 2/2013 | Leet | F16M 11/041 |
| | | | | 248/316.4 |

\* cited by examiner

SKATEBOARD MOUNT AND SPIN MOUNT

RELATED APPLICATIONS

Related applications include U.S. application Ser. No. 17/815,385 filed Jul. 27, 1922, and U.S. Pat. No. 11,421,820 filed Sep. 10, 2020.

BACKGROUND OF THE INVENTION

The present invention is in the technical field of skateboards. More particularly, the present invention is in the technical field of skateboard accessories. More particularly, the present invention is in the technical field of multipurpose and functional skateboard hangers.

Skateboarders often hold a great reverence for their boards and like to display them on walls like artwork in a floating position. In this position the board is generally supported in the central area of the board around a couple of inches or so off of the wall, however due to the curvature of the board the nose or tail of the board may still touch the wall. This position highlights the graphic artwork and designs (also called the Graphic) imprinted on them. When attaching the board to the wall or a hanger the use of grooved metal rods or anchors with sharp edges can damage the Graphic.

Prior art designs for devices intended to hang and display skateboards generally involve the use of threaded bolts and nuts that attach through the holes intended for mounting the wheel assembly with screw on nuts attached to alternate sides of the board. Alternative designs for the display of skateboard decks involve the use of a shelving type system where a skateboard deck is laid on it at an angle.

SUMMARY OF THE INVENTION

The present invention is in the technical field of skateboards. More particularly, the present invention is in the technical field of skateboard accessories. More particularly, the present invention is in the technical field of multipurpose and functional skateboard hangers.

Skateboarders often hold a great reverence for their boards and like to display them on walls like artwork in a floating position. In this position the board is generally supported in the central area of the board around a couple of inches or so off of the wall, however due to the curvature of the board the nose or tail of the board may still touch the wall. This position highlights the graphic artwork and designs (also called the Graphic) imprinted on them. When attaching the board to the wall or a hanger the use of grooved metal rods or anchors with sharp edges can damage the Graphic.

Prior art designs for devices intended to hang and display skateboards generally involve the use of threaded bolts and nuts that attach through the holes intended for mounting the wheel assembly with screw on nuts attached to alternate sides of the board. Alternative designs for the display of skateboard decks involve the use of a shelving type system where a skateboard deck is laid on it at an angle.

BRIEF DESCRIPTION OF DRAWINGS

FIG. 4 is a side view of a pin type a.

DETAILED DESCRIPTION

Figure 1:
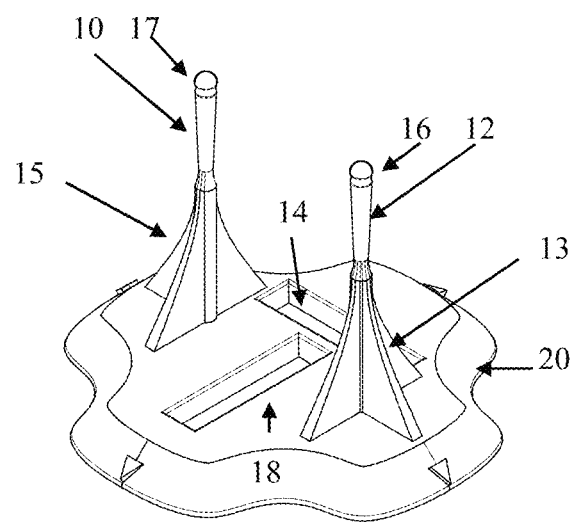
FIG. 1 is a perspective view of the one piece skateboard hanger.

The skateboard hanger in FIG. 1 is one piece with a set of members called pins. The pins have a smooth surface and are sealed into the base 20 in a fusion joint. The bottom portion of the pins 13, 15 is comprised of 3 triangular shaped flanges extending from the center rod with the large end of the triangle making a T-shaped footprint on the surface of the base 20. Rectangular cavities 14, 18 are placed between the 2 pins and may be used to place bubble levels to aid in the placement of the hanger.

A skateboard deck can be placed on the skateboard hanger with the pins inserted into the mounting holes and can rest against the edge of the bottom portion 13, 15 of the pin. This edge is near the center of the pin. Rising from the center of the pin is a top portion 10, 12. The top portion is thin and has a rod like shape with a diameter that is smallest near the center gets larger toward the tip of the top portion of the pin near 16, 17. The top portion is the part that is inserted into the mounting holes of the skateboard deck. Near the tip of the top portion of the pin is a small decrease in the diameter of the rod 16, 17. This small groove goes all the way around the pin and is configured to stabilize the position of an O-ring.

The hanger can be constructed from plastic, metal, carbon fiber or a variety of other materials. When the hanger is constructed from plastic, a clear polycarbonate is preferred. The strength requirement of the pin materials is for the weakest point of the pin to withstand the sheering force of a typical skateboard deck without a breakage. Coatings can be used to either strengthen or smooth the surface of the pin.

Figure 2:
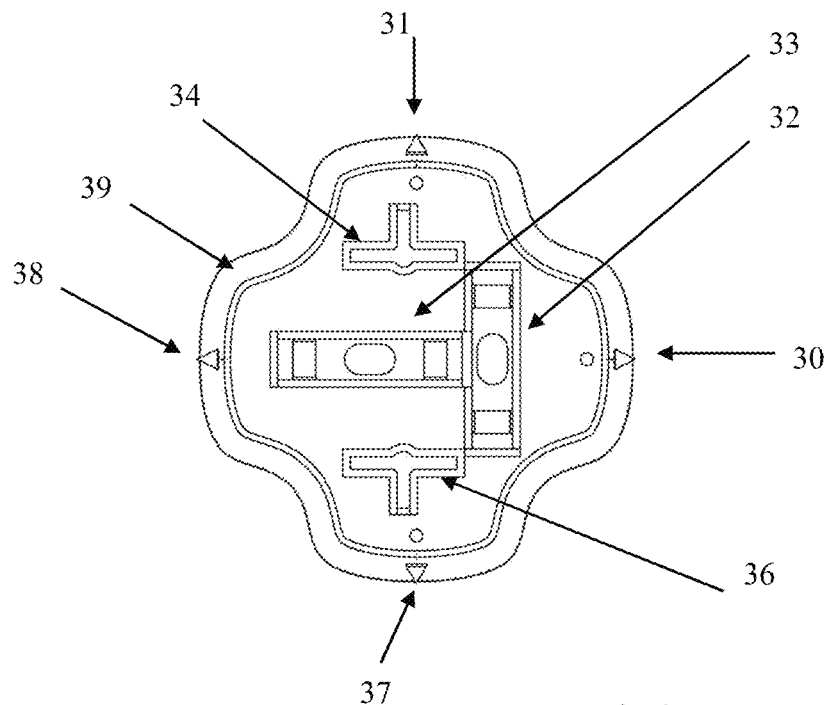
FIG. 2 is a head on view of a modular base without pins.

Referring now to the invention shown in FIG. 2 the base of the hanger resembles a rounded plus shape. This is a modular embodiment of the hanger wherein, the components can be inserted into the required slots. The base of the hanger has a raised edge 39 that runs all the way around the base of the hanger, with a set of triangular arrows that mark the middle top 31, middle bottom 37, middle right 30, and middle left 38 points of the plus. In the center of the base are 2 cavities which resembles a sideways T formation 33, 32 wherein each insert cavity may contain a bubble level. Both of these cavities are raised from the surface of the base of the hanger. There is also an oval hole in the beneath of each bubble level holder which can be used when the bubble level holder is popped out. This oval hole can be used with screws or screw like drywall anchors to affix the skateboard hanger to the wall. The T formation 33, 32 is aligned perpendicular to the axis 31, 37 of the hanger base. The pins are attached to the base with a modular joint to a set of slots that resembles an upside down T 34, or a right side up T 36 with a small bulge in the middle. The top and bottom alignment indicators 31, 37 assists in positioning and leveling the hanger in one direction. Right and left alignment indicators 30, 38 assists in the positioning and leveling of the hanger in the other direction. If two or more hangers are used the alignment indicators assist in the alignment of the hangers.

Further referring to the invention shown in FIG. 2 the raised edge 39 gradually rises from the outside edge to a point inside the base of the skateboard hanger. Inside the raised edge is an area where the thickness of the base of the hanger is reduced. This area of reduced thickness is suitable for a graphic insert.

Further referring to the invention shown in FIG. 2, the base of the skateboard hanger has a flat back suitable for 1 or more hook and loop style adhesive strips to be applied vertically in a side by side fashion. Due to the rectangular wheel assembly mounting pattern on typical skateboard decks, the skateboard hanger is rotated depending on if a person would like to hang a skateboard deck vertical or horizontal. The adhesive strips are designed to be used in a vertical orientation on the wall (long ways in the direction of the floor and ceiling). With the "plus" shape, the adhesive strips will be placed in a vertical orientation which changes to accommodate the preference of a vertical or horizontal display of the skateboard deck. Note that one hanger is needed to hang a skateboard deck vertically and two skateboard hangers are needed to hang a skateboard deck horizontally.

Further referring to the invention shown in FIG. 2, if the base is placed against the wall as shown, a bubble level in the bubble level holder 33 will be used to indicate if the axis between 38 and 30 is level and whether or not the tops of the pins are aligned up and down. When the invention is positioned as shown in FIG. 2, a set of 2 hangers can be arranged horizontally from each other allowing the skateboard deck to be positioned horizontally. In this position the pins of each skateboard hanger pass through a set of mounting holes on either side of the skateboard deck. The pins will protrude through the mounting holes to just beyond the surface of the skateboard deck. This arrangement allows for the use of the position indicators to indicate where the user wants the skateboard deck placed and if the two hangers, are lined up. If the hanger is turned 90 degrees counterclockwise the other a bubble level in bubble level holder 32 can be used to indicate whether or not an axis along the triangular indicators 31-37 is level. This is the position to hang a skateboard deck vertically. Only one hanger is needed to hang a skateboard deck from this position.

The form of and shape of the raised edge and alignment indicators does not preclude other shapes that fulfill a similar purpose and function. For example, the width of the outside edge may be significantly larger than a point, and the alignment indicator may be comprised of ink. Also not precluded from this invention are shapes other than the shown rounded plus shape that the raised edge follows. Other acceptable shapes for the raised edge to follow include round, square, and oval, and other shapes with symmetry that does not preclude the proper alignment of the hanger elements.

Figure 3:
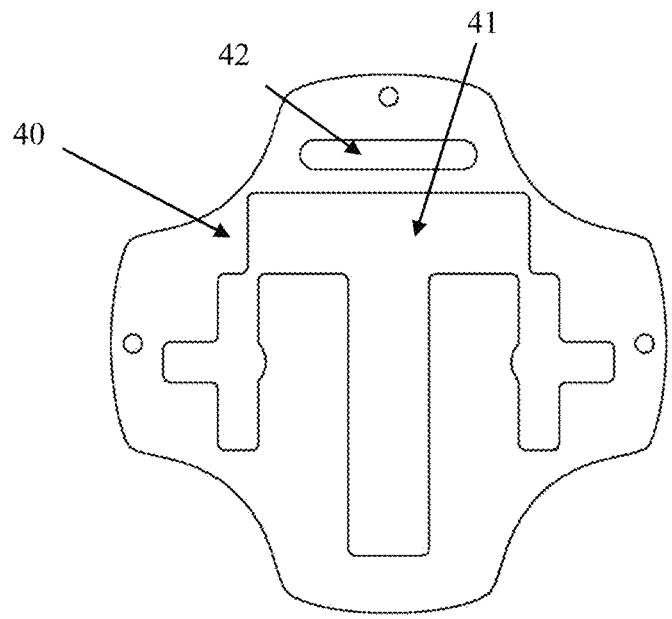
FIG. 3 is a head on view of an insert that fits into the base of FIG. 2.

Referring now to the invention shown in FIG. 3 a graphic insert 40 can be placed in a modular base or in a one piece hanger base. The holes in the insert 41 match up with the features in the base or as seen here, the features of FIG. 2. There may also be trademarks and logos that can be seen through the other hole 42 in the insert. The area in the center of the hanger base can be recessed to make room for a graphic insert 40. The graphic insert can be solid color or decorated with a graphic design.

Further referring now to the invention shown in FIG. 3 the graphic insert 40 fits within the confines of the raised ridge that runs all the way around the base. The raised ridge is around one half centimeter in width however; it can be made smaller or larger depending on the aesthetic(s) desired. In the one piece embodiment the insert can be laid in a similar position. This insert will have cutouts for the pins and the bubble levels 41. The size, position, and dimensions of the graphic insert are based on the features of the hanger which are wished to be accentuated or concealed.

Figure 4:
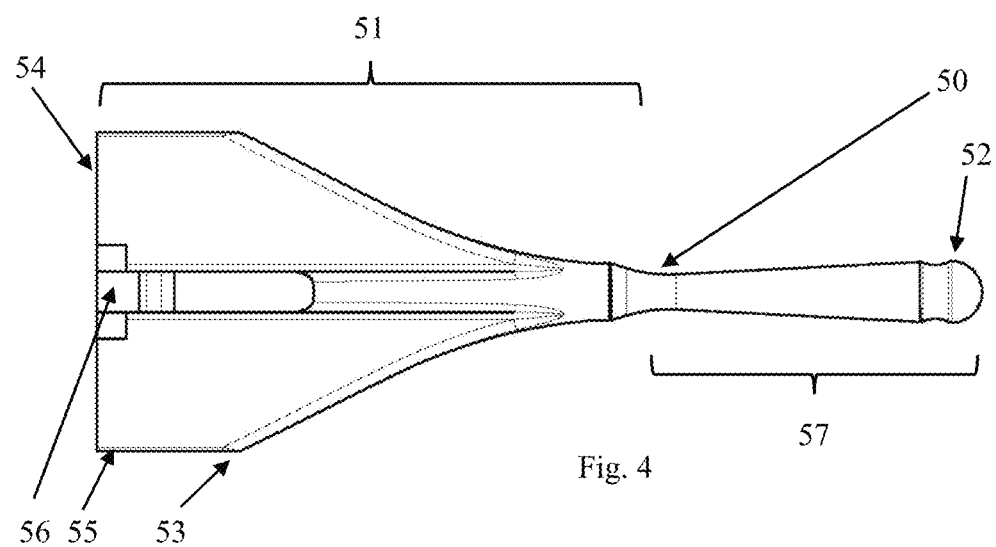

Referring now to the invention shown in FIG. 4 a pin of type a is shown. The pin is configured to fit in a modular base. The bottom portion 51 has 3 flanges 54, 55, 56 that form a T-shaped junction similar in shape to that of the junction 34, 36 seen in FIG. 2. The T-shaped junction will fit into the T-shaped slots of the base forming the modular joint. Examples of the T-shaped slots are seen in FIG. 2 34, 36. The bottom portion of the pin has a minimum width at point 50 and gradually gets bigger till it hits point 53 at which point the width is at a maximum. The flanges 54, 55, and 56 are structural in nature helping to support the weight of the skateboard deck. Center flange 56 points away from the other pin when locked into the modular base, with a flexible tab that helps lock the pin into the T-shaped slot. A small ledge opposite flange 56 on the end of the bottom of the center rod of the pin will work together with the tab on flange 56 helping to lock the pin into the T-shaped slot of the modular base.

Further referring to FIG. 4, the top portion of the pin 57, the diameter will gradually get larger from point 50 toward the opposite end of the pin until it hits point 52. At this point there is a small groove that goes all the way around the pin configured to stabilize the position of an O-ring. The O-ring acts as the locking extension in pin a. The top portion of pin type a 57 is the same as seen FIG. 1, but the junction with the base is changed. The resting position of the skateboard deck will generally be either at the minimum radius point 50 or against the O-ring on point 52.

Figure 5:
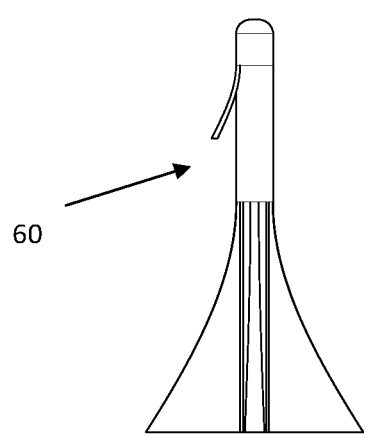
FIG. 5 is a side view of a pin type b.

Referring now to the invention shown in FIG. 5 a pin of type b. Pin type b is shown with a locking extension on the top portion of the pin. This locking extension 60 rises slowly from the tip of the pin on a single side forming a ledge near the middle of the top portion of the pin. The locking extension can pass all the way through the mounting holes. When the pin has been inserted into the mounting holes the skateboard deck rests on the pin and the ledge of the locking extension 60 blocks the skateboard from falling off the pin.

Figure 6:
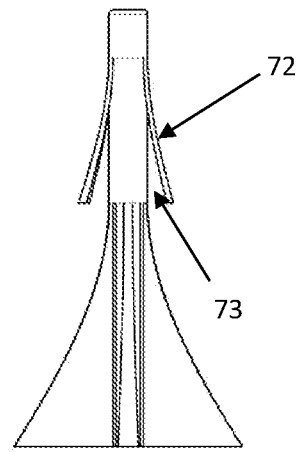
FIG. 6 is a side view of a pin type c.

Referring now to the invention shown in FIG. 6 a pin of type c. Pin type c is shown with a locking extension on the top portion of the pin. This locking extension 72 rises slowly from the tip of the pin on two sides. There is a small gap 73 between the large end of the locking extension and the pin. The locking extension with a gap underneath it is designed with a flexible material in its construction. When squeezed the locking extension 72 can flex to occupy part of the small gap 73. When the pin has been inserted into the mounting holes the locking extension wedges in the mounting holes and the pressure prevents the deck from sliding off the pin.

Figure 7:
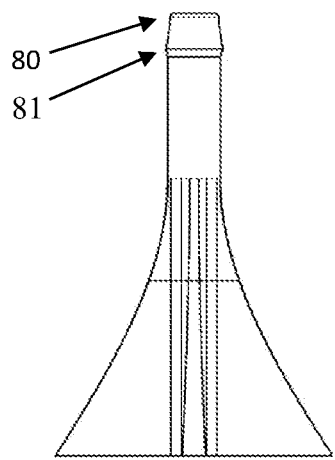
FIG. 7 is a side view of a pin type d.

Referring now to the invention shown in FIG. 7 a pin of type d. Pin type d is shown with a locking extension shown on the tip of the pin. This locking extension has the shape of a lightly sloped conical frustum with the tip of the pin 80 being the small end of the conical frustum and the large end 81 being a small distance from the tip. The pin can easily pass through the mounting holes. When the pin has been inserted into the mounting holes the skateboard deck rests on the pin and the ledge 81 of the conical frustum. This extension blocks the deck from sliding off the hanger. The O-ring is not necessary for the proper functioning of this locking extension.

Figure 8:
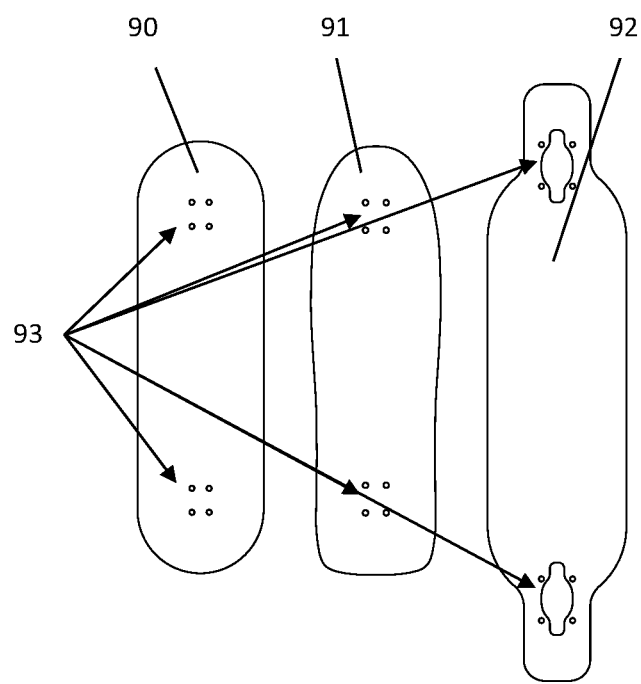
FIG. 8 is a drawing of the common types of skateboards.

FIG. 8 shows the position of the mounting holes 93 in the various types of skateboards. 90 is a popsicle skateboard deck, 91 is an old school skateboard deck, and 92 is a longboard skateboard deck.

Figure 9:
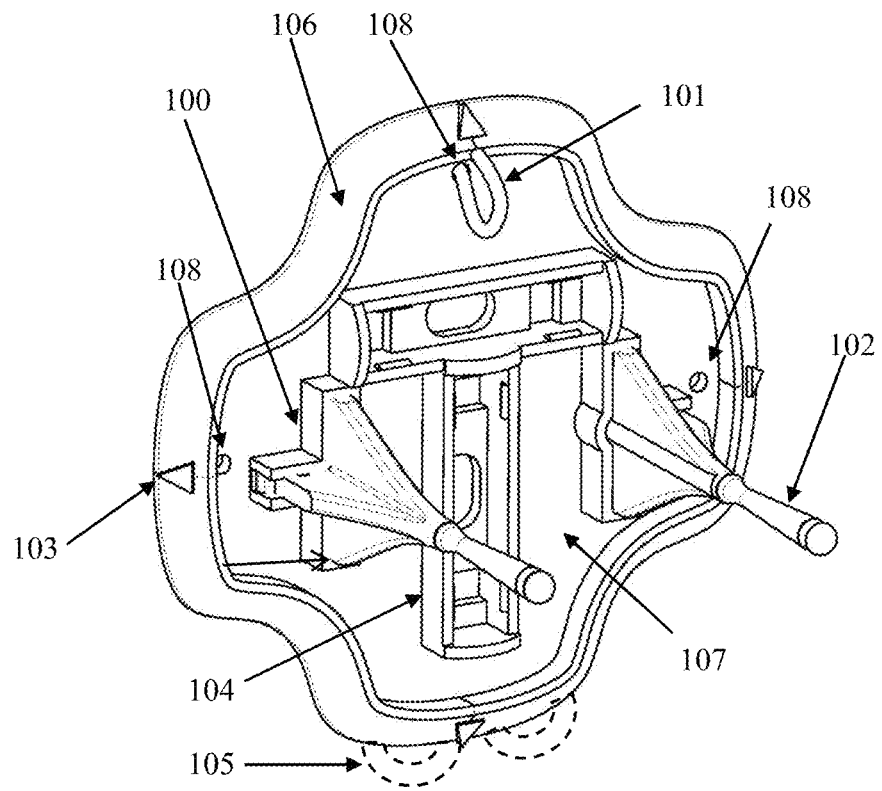
FIG. 9 is a drawing of a modular hanger with a drywall hook.

Referring now to the invention shown in FIG. 9 a modular hanger with the pins 102 inserted into T-shaped slots 100. The hanger base of FIG. 9 is similar to the hanger base in FIG. 2 in shape. It contains the alignment arrows 103 on the raised edge 106 of the hanger base, and the 2 slots for bubble levels 104. On the bottom of the hanger are the tabs for 2 adhesive strips 105 that line up on the back of the hanger. These strips have the capacity to support a typical skateboard deck. For further stability a modified drywall hanging hook 101 can be inserted through the hanger and the drywall. The drywall hook is curved such that it can be threaded through one of the holes 108 positioned at either the top or sides of the hanger shown here. In the present configuration the hook would be positioned as shown. If the hanger is turned on its side, then a new hole 108 would be used. However, in this new position the drywall hook would still be put in the hole on the top, but the pins would be in the top/bottom positions instead of the side to side position. The drywall hook will be a piece of wire that sticks out of hole 108 and makes contact on the raised ridge. Without the adhesive strips the drywall hook can still be used with the functionality that is expected from a drywall hook. The graphic insert of FIG. 2 should be useable for this hanger as shown here. The graphic insert 107 can be modified for use when features like the bubble levels have been removed.

Figure 10:
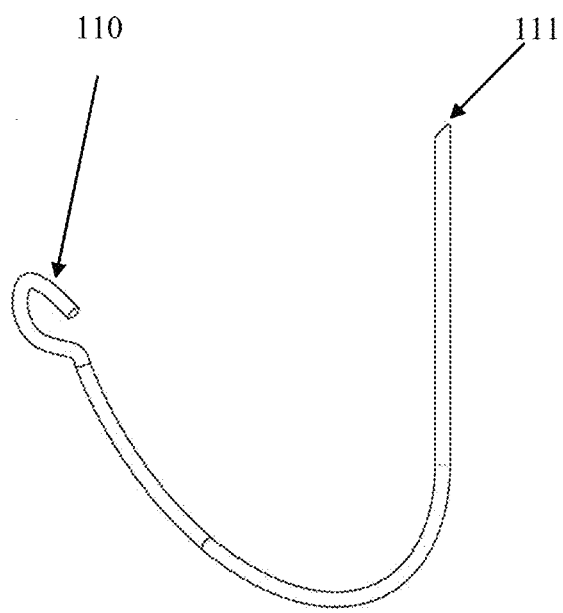
FIG. 10 is a drawing of a drywall hook designed to work with the skateboard hanger.

Referring now to the invention shown in FIG. 10 the drywall hook is shown in full here. The drawing shows the curvature needed to hold a stabilizing position with or without a stabilizing adhesive material applied to the back of the hanger. The drywall hook 110 is curved such that when pushed into the intended hole on the hanger as shown in FIG. 9 (101) the point 111 will embed itself into the back of the drywall stabilizing the hook and the hanger.

The use of a drywall hook, a screw, or a screw type drywall anchor, for attaching a base to the wall, should allow for a wall attachment of heavier skateboards decks and a skateboard with wheel assembly attached. In an alternative attachment of the base to the wall, the oval hole underneath one of the bubble level holder (e.g. FIG. 9 104) would be used with a screw or screw in drywall anchor. The oval hole allows for small adjustments in one direction of the base to be made after an initial installation. When this attachment method is used in combination with metal pins and or pins wherein the locking extension comprises; threading and a nut, enables the use with a fully assembled skateboard. When using a threaded locking extension, the nut would go on the side of the skateboard deck facing away from the wall.

Figure 11:
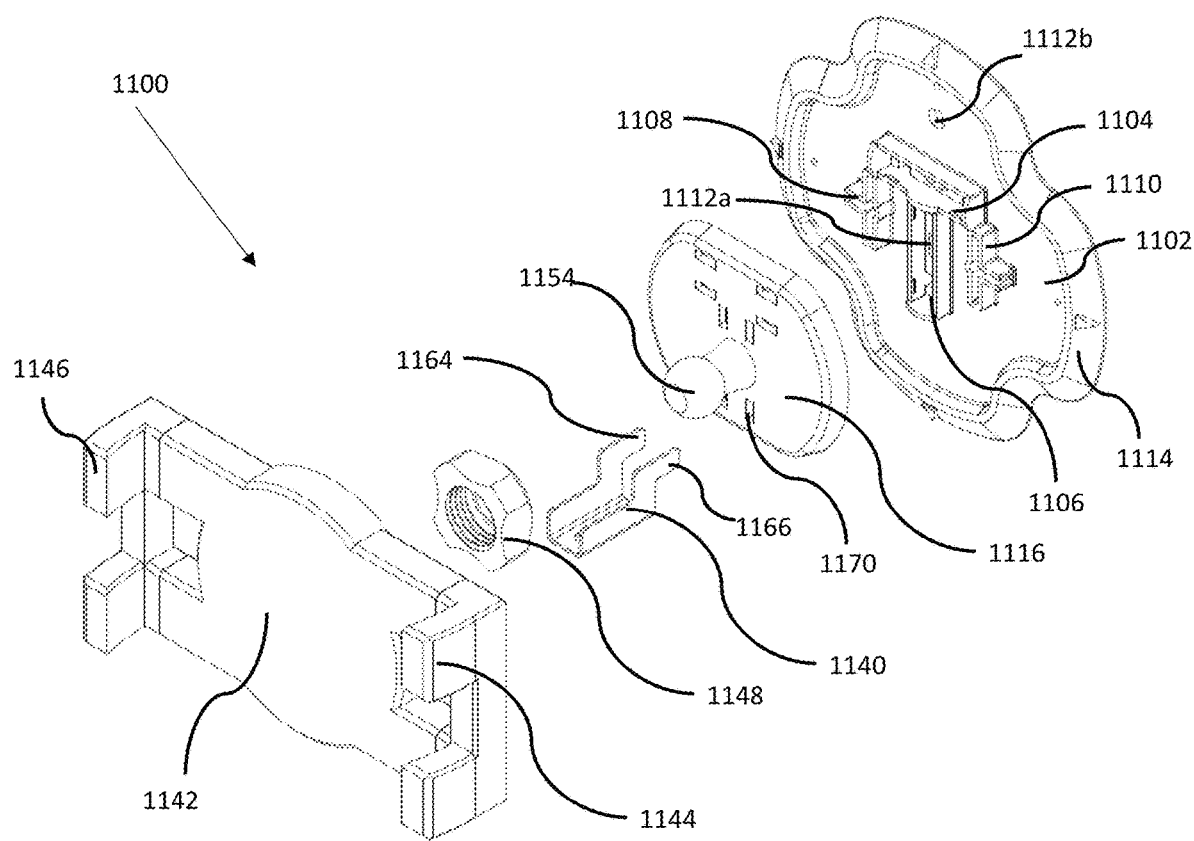
FIG. 11 is an exploded view of another embodiment of the skateboard hanging device with a cradle mount.

FIG. 11 illustrates an exploded view of another embodiment of the skateboard hanging device of the present invention in accordance with the disclosed structure. More specifically, the skateboard hanging device 1100 is a multipiece device and includes a plurality of interconnected and modular components that can be assembled and disassembled using hands without much effort and without requiring any tools. The device 1100 includes a mounting base 1102 which has a similar size and shape as of the base illustrated in FIG. 2.

Figure 12:
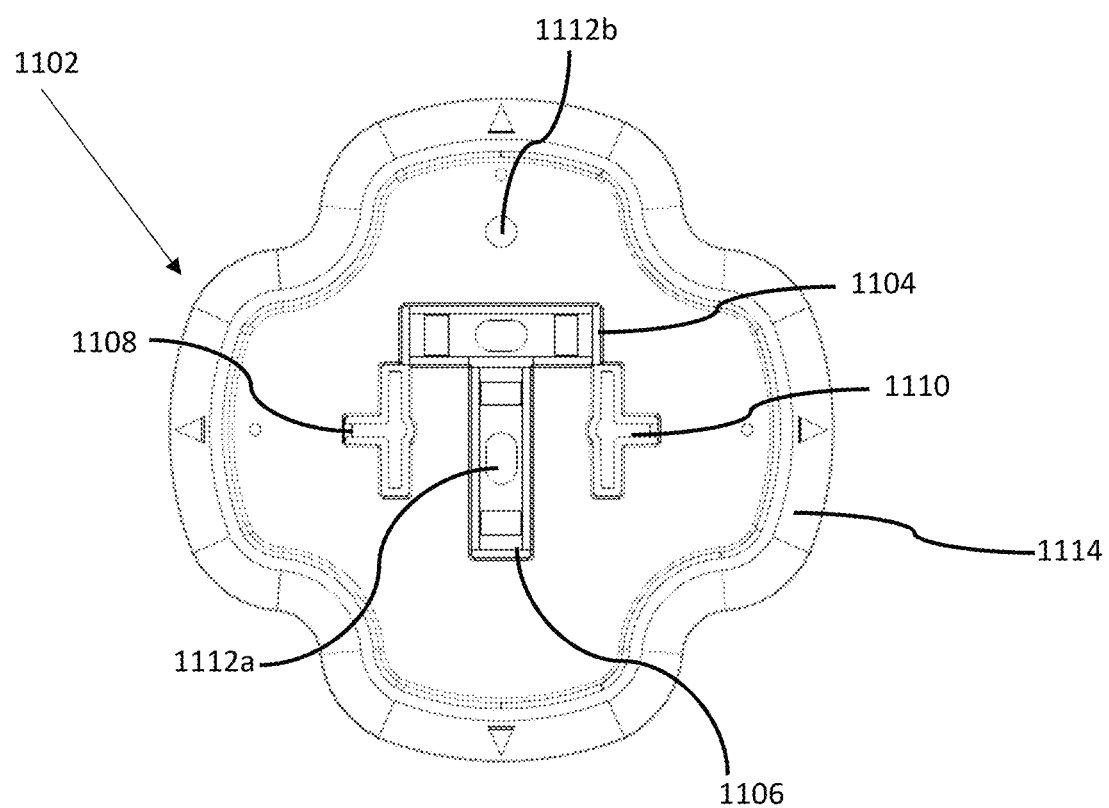
FIG. 12 is a front view of base of the skateboard hanging device.

Referring to FIGS. 11 and 12, the base 1102 includes two transverse bubble level holders 1104,1106 and a pair of two T-shaped slots 1108,1110 similar to the base of FIG. 2 and includes holes 1112a,1112b for allowing a screw to pass through each hole independently, allowing a user to fasten the base 1102 to a wall. The base 1102 has a rounded plus shape and has a raised edge 1114 that runs all the way around the periphery of the base 1102. As described, the base 1102 is designed to be secured to conventional wall such as a drywall using a fastener such as a drywall hook, a screw, or a screw type drywall anchor and can also be fastened using "damage-free"/"stretch-and-release" adhesive strips.

Figure 13:
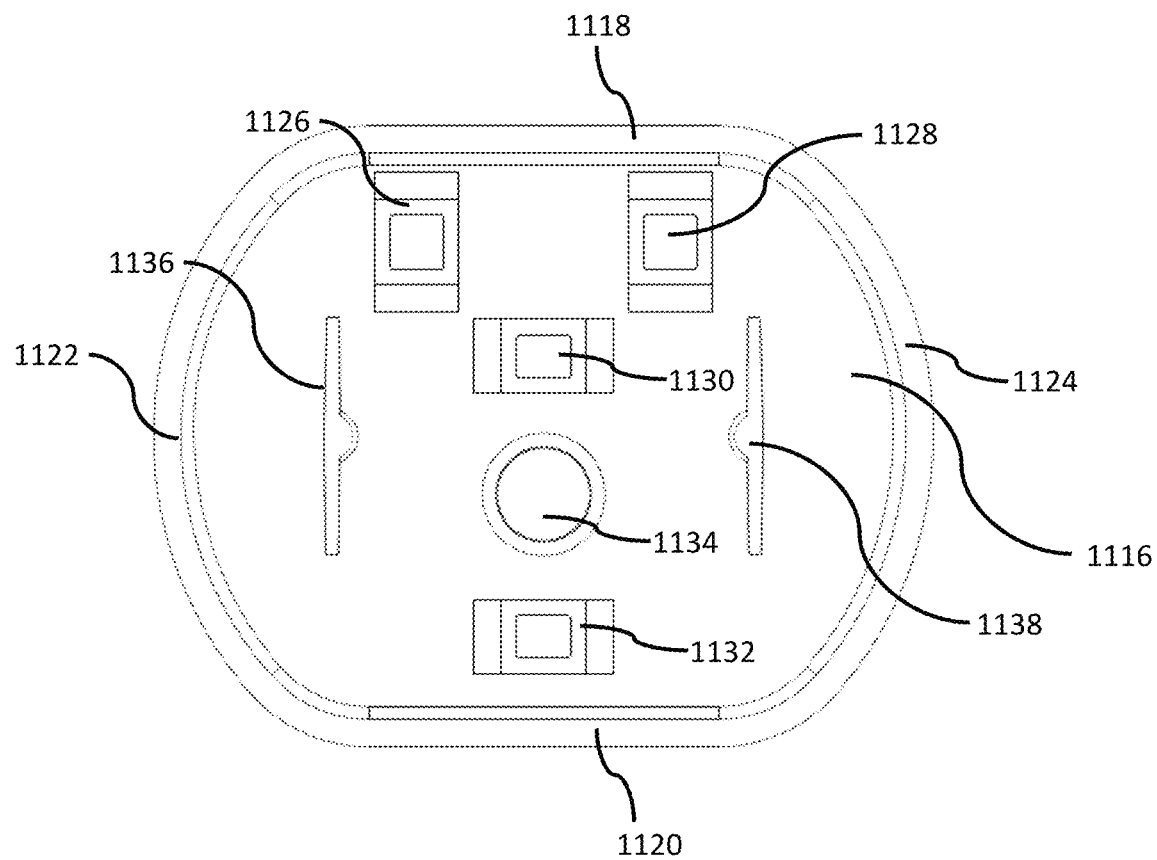
FIG. 13 is a rear view of ball adapter of the skateboard hanging device.

A ball adapter 1116 is designed to detachably attach to the base 1102 and is snapped to the base 1102 without using any tool. Now referring to FIGS. 11, 13, and 18 the ball adapter 1116 is generally capsule shaped and has a linear top edge 1118 and a linear bottom edge 1120. The linear edges 1118,1120 are connected via curved sides 1122,1124. A pair of tabs 1126,1128 are disposed along the top edge 1118 and a second pair of tabs 1130,1132 are disposed along the center of the adapter 1116 on either side of a central hole 1134. Two T-shaped tabs 1136,1138 are disposed along opposite sides of the central hole 1136.

Figure 14:
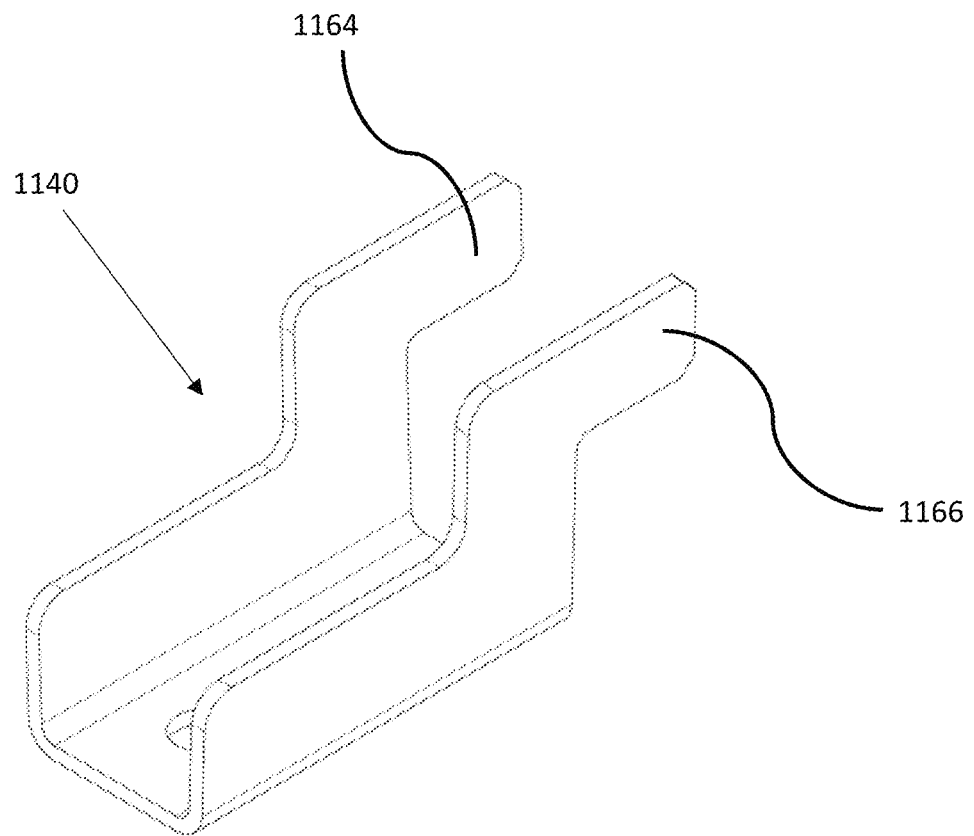
FIG. 14 is a perspective view of the tilt lock.

Referring to FIGS. 11 and 14, a tilt lock 1140 is designed to support a skateboard and prevents the skateboard from falling into a tilted position. The tilt lock 1140 is made of plastic and provides support and allows the skateboard to be parallel with the skateboard hanging device on which the skateboard is mounted, and the surface on which the skateboard hanging device is mounted. Or in the alternate, the tilt lock is made of a flexible metal and is wider than the holes 1168 & 1170. Therefore, to insert it a set of fins, 1164 & 1166 are pinched together. The outward pressure of the fins on the holes 1164 and 1166 keep the tilt locked into place.

Figure 16:
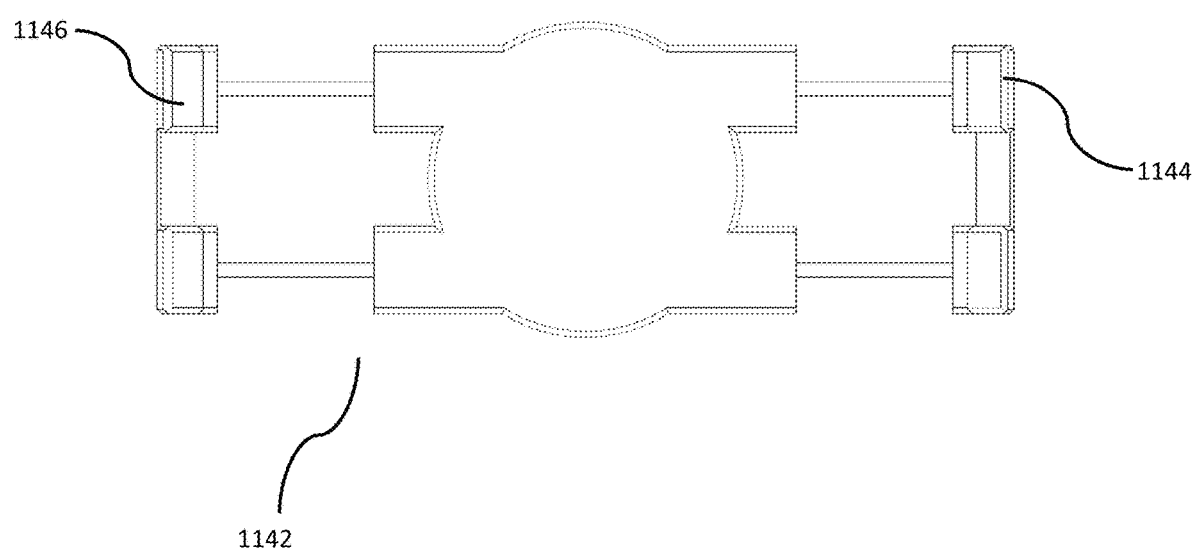
FIG. 16 is a front view of cradle mount in an extended position.

FIG. 16 illustrates a front view of the cradle mount 1142 with the spring-loaded clamps in extended position, as per an embodiment of the present invention.

Figure 15:
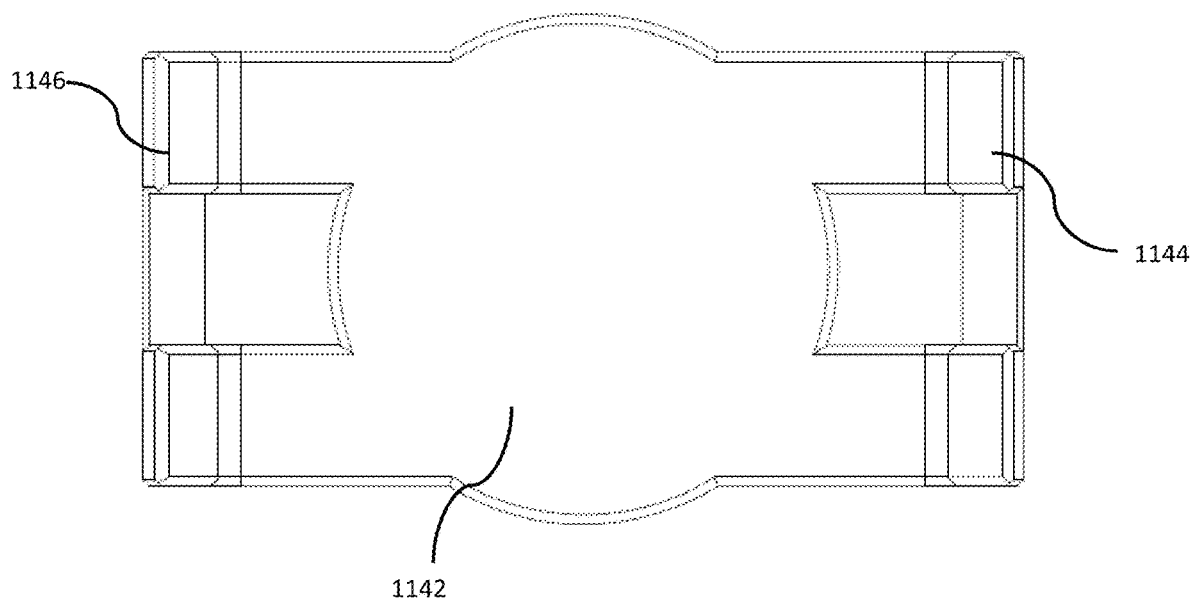
FIG. 15 is a front view of cradle mount of the skateboard hanging device.

FIGS. 11, 15 and 16 illustrate a cradle mount 1142 in which a front of the cradle mount is seen. The cradle mount 1142 has a pair of opposite spring-loaded clamps 1144,1146 that can be extended in opposite directions (as illustrated in FIG. 16) to accommodate skateboards of different sizes. The cradle mount 1142 is mounted to the ball adapter 1116 and is secured using a collet nut 1148.

Figure 17:
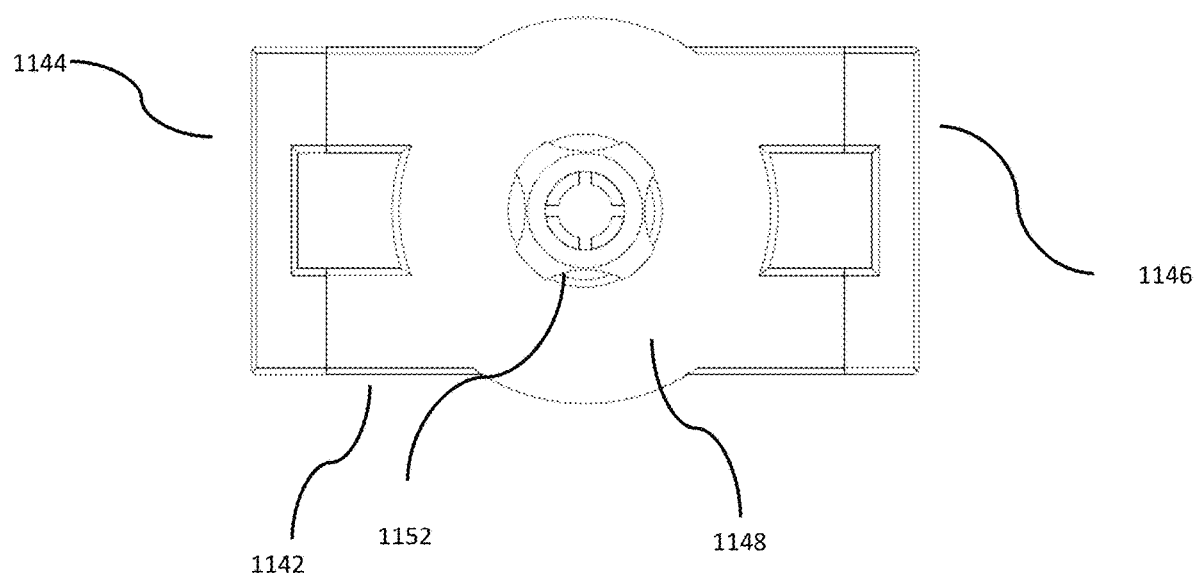
FIG. 17 is a rear view of the cradle mount of the skateboard hanging device.

Referring to FIG. 17, the rear view of the cradle mount 1142, the socket 1152, and the collet nut 1148 is disclosed. This rear view of FIG. 17 of the cradle mount 1142 includes the socket connection 1152, and the collet nut 1148 that is fastened to ball (not shown in FIG. 17) 1154 of the adapter 1116. It will be apparent to a person skilled in the art that the ball 1154 is designed to easily connect to the socket 1152 positioned on the back of the cradle 1142. Further, the collet nut 1148 is tightened around the socket 1152 by hand for securing the ball and socket connection. The cradle 1142 can have a logo, trademark or indicia for branding or marketing purposes.

Referring again to FIGS. 12 and 13, for attaching the ball adapter 1116 to the base 1102, the tabs 1126,1128 are snapped into the bubble level holes 1156,1158 respectively. The bubble level holes 1156,1158 are same as used in the base of FIG. 2, thus, the base 30 of FIG. 2 can be repurposed for FIG. 11. Similarly, the tabs 1130,1132 are snapped into the bubble level holes 1160,1162 respectively. For a stable and strong connection between the ball adapter 1116 and the base 1102, the tabs 1136,1138 snap into the T-shaped slots 1108,1110 respectively. The opening 1134 aligns with the hole 1112a allows a person to be able to reach the wall screw with a screwdriver without having to disassemble the ball adapter 1116 and base 1102.

Figure 18:
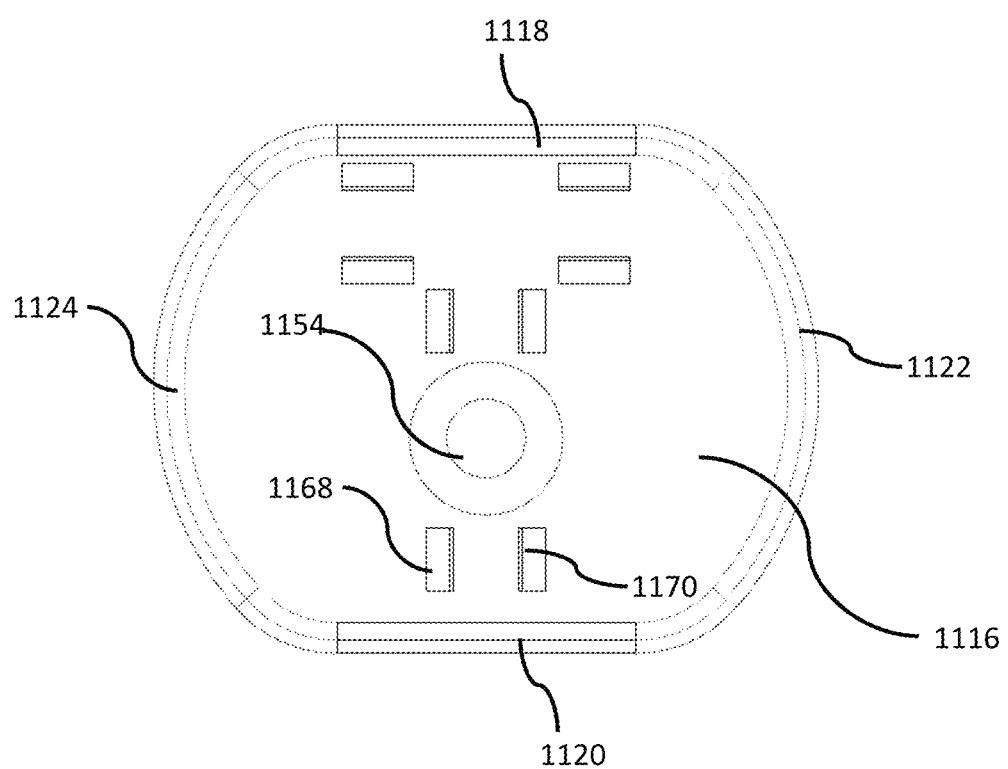
FIG. 18 is a front view of the ball adapter.

FIG. 18 illustrates the front view of the ball adapter component 1116 in accordance with the disclosed structure. Referring now to FIGS. 11, 14 and 18, the arms 1164,1166 of the tilt lock 1140 are snapped into the slits 1168,1170 of the ball adapter 1116 for allowing a secure arrangement of the ball adapter 1116 and the tilt lock 1140. The tilt lock 1140 does not move or slide when snapped into the slits 1168, 1170.

Figure 19:
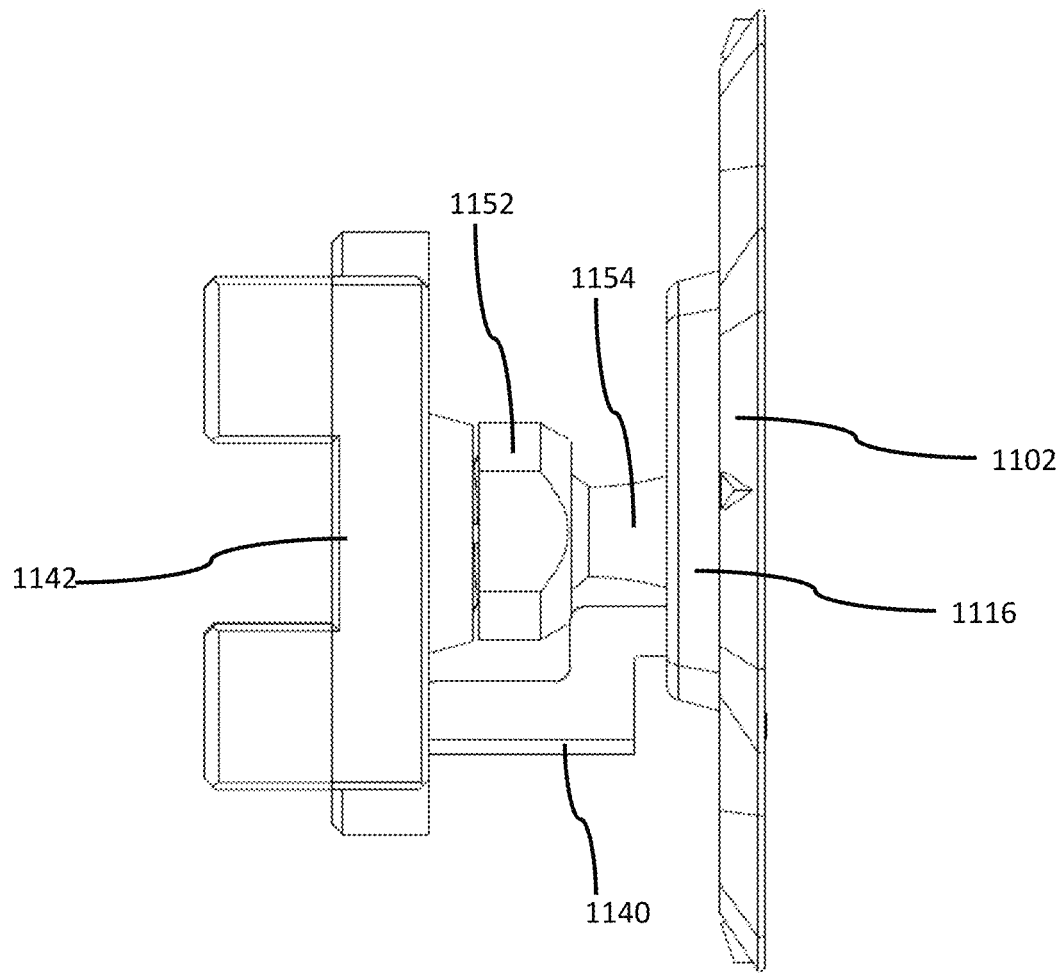
FIG. 19 is a side view of the skateboard hanging device in an assembled position.

FIG. 19 illustrates a side perspective view of the skateboard hanging device 1100 in an assembled form in accordance with the disclosed structure. The base 1102 is detachably attached to a drywall using a fastener or adhesive strips which are attached to the rear surface of the base 1102. The ball adapter 1116 is snapped to the base 1102 by snapping the tabs into the bubble level grooves and T-shaped slots as described earlier in the disclosure. It should be noted that the base 1102 and the adapter 1116 can be attached without using tools and the ball adapter 1116 adheres to the front surface of the base 1102.

The cradle mount 1142 is secured to the ball adapter 1116 using ball and socket system with socket 1152 secured to the ball 1154. The socket 1152 and the ball 1154 are compatible and provide a secure attachment. For providing additional support to a skateboard and keeping the skateboard parallel to the wall, the tilt lock 1140 supports the cradle mount 1142 and rests against the rear surface of the cradle mount 1142.

Figure 20:
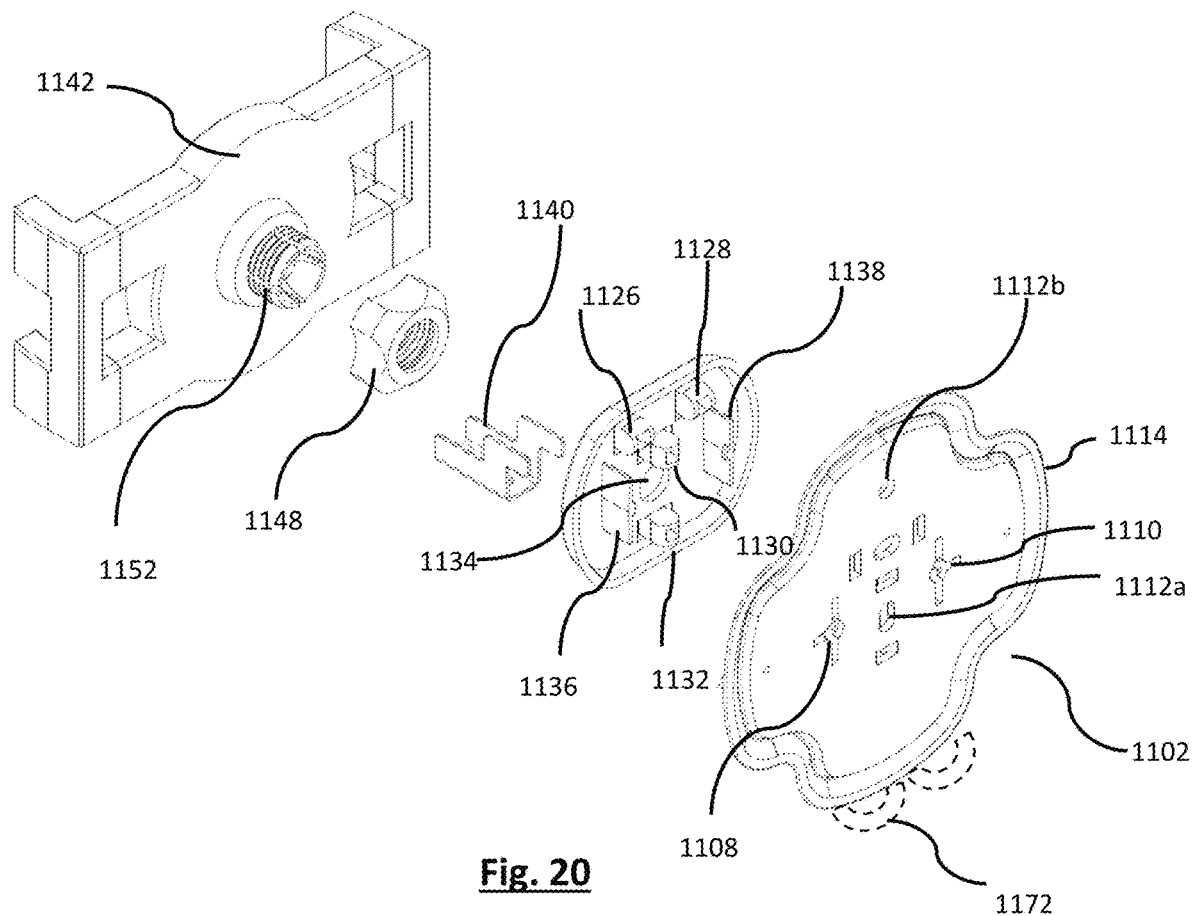
FIG. 20 is a rear exploded view of the skateboard hanging device with a cradle mount.

FIG. 20 illustrates a rear exploded view of the multipurpose skateboard hanging device 1100. The raised edge 1114 of the base 1102 abuts against a wall such as a drywall and is fastened using screws passing through the holes 1112a, 1112b for fastening into the wall or attached through adhesive strips 1172. The tabs 1126,1128 are snapped into the holes 1156,1158, tab 1132 snaps into hole 1162, and tabs 1136,1138 snap into the grooves 1108,1110 respectively. The cradle 1142 is secured using the socket 1152 fastened to the ball having the hole 1134. The collet nut 1148 is used for further providing support and securing ball and socket connection.

The advantage of the device 1100 is that only one hanger is required to mount a skateboard and can be positioned at any angle using the tilt lock 1140. Rotation of the skateboard can be done without unmounting the hanger device 100. The skateboard deck is not mounted using fasteners and therefore, artwork skateboards without having mounting holes can also be mounted easily. The device 100 can be assembled and disassembled without using any tools and can be repositioned easily.

Figure 21:
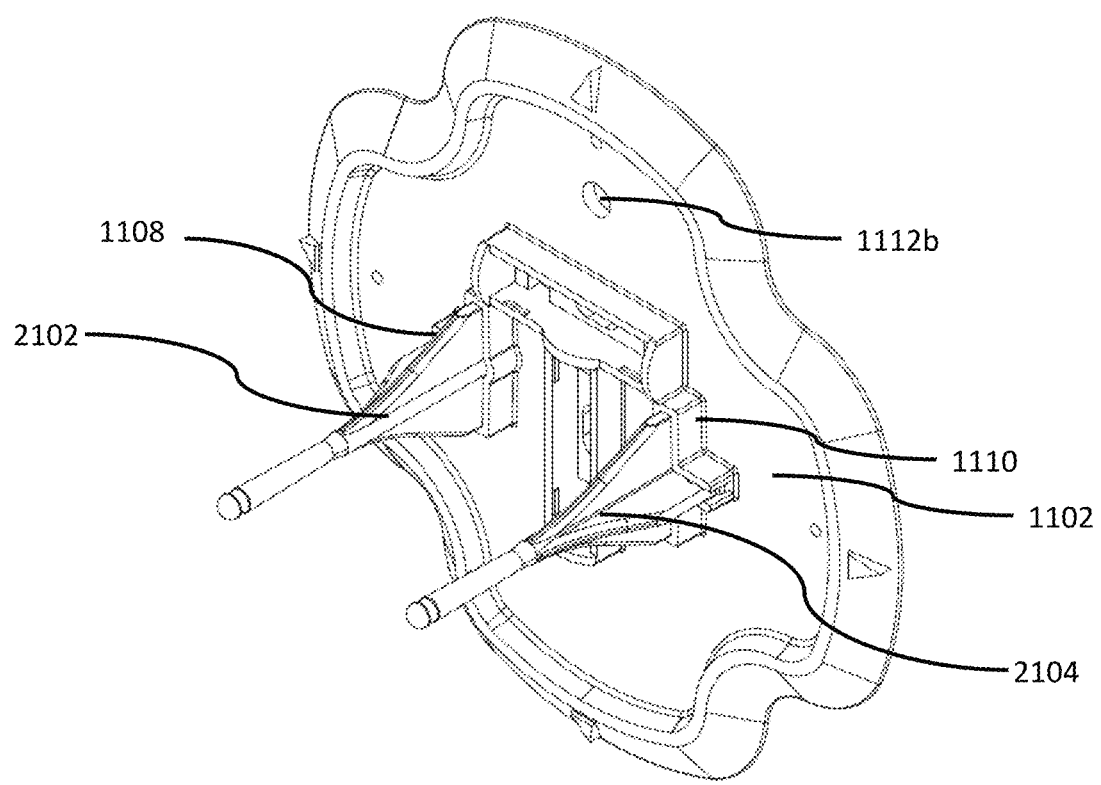
FIG. 21 is a diagram showing the pins attached to the base of the skateboard hanging device.

FIG. 21 illustrates the pins attached to the base 1102 for use as the first embodiment in accordance with the disclosed structure. As illustrated, the pins 2102,2104 are attached to the T-shaped slots 1106,1110 respectively for use the base 1102 in a device that is functionally the same as the skateboard hanging device of FIG. 9 with the exception of the holes 1112a,1112b seen in FIG. 12, and FIG. 21 but not in FIG. 2, FIG. 9. It will be apparent to a person skilled in the art that the base 1102 and the base of FIG. 2 are structurally and functionally similar and can be interchanged with the only change of the additional holes 1112a,1112b in the base 1102.

The advantages of the present invention include, without limitation allowing a person to hang a skateboard easily using no additional tools, while not damaging the wall. Further, the hanger may include features that simplify the installation process and allow for adjustments to be made to the hanging position in any direction after the skateboard was initially hung, without damaging the wall or needing additional tools. The support pins have been designed so that they are ideal for hanging skateboard decks that are still in the wrapping plastic.

The hanger further has the advantage that it can keep the skateboard securely placed on the hanger while still allowing a person to intentionally remove and reinstall the skateboard easily and quickly, without the need for tools or having to hand loosen/tighten screw-on type locking hardware. Alignment arrows have been added to the outside edge of the base in case the hanger was to be aligned with an exact position marked on the wall at the time of the initial hang or during any adjustments. The bubble levels also assist in the placement of the hanger in either the vertical or horizontal directions. With the perpendicular placement, the bubble levels can be effectively used to hang a skateboard vertically or horizontally.

The hanger further has the advantage in that it does not significantly distract from or cover the skateboard deck graphic. In the preferred embodiment, the hanger will be manufactured as a ridged clear plastic device and the O-rings or any soft locking extensions would be manufactured in a soft clear plastic (e.g. silicone) to achieve the preferred minimal intrusive appearance. The O-ring's outer diameter was also sized accordingly, based on the typical diameter of a mounting hole for a skateboard, to provide the preferred minimal appearance and to still function as intended. Note that other hanger colors may ultimately be manufactured.

In broad embodiment, the present invention is a hanger for a skateboard that uses members with an end portion that engages the mounting holes of a skateboard. The end portion is the part of the member that can be inserted into the mounting holes of the skateboard deck. The members are mostly smooth but with an end that can make a small hole in the wrapping plastic upon insertion. Each end portion also contains one or more features that prevent the skateboard deck from sliding off the member. For example, an O-ring and or a plastic ledge may be placed on a smooth member to prevent displacement of the skateboard deck from the hanger. This locking extension on the end of the member prevents the skateboard deck from moving.

In broad embodiment, the present invention comprises a base for a hanger for a skateboard with the features, 2 or more alignment indicators, and at least two slots or holes for the members to hold the skateboard, a flat back configured to attach to a wall with the attachment means comprising: removable or permanent adhesive strips; an adhesive hook and loop combination; and liquid adhesive, drywall hook, screws, and screw type drywall anchors. The slots are designed to hold two members in a position perpendicular to the wall. The base can also be configured as a single unit with the slots being position holders for the members, with each member being fused into the base. The base is comprised of plastic, clear plastic, metal, a coated metal, or wood.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A hanging device for a skateboard, a multipiece device with a plurality of interconnected and modular components that can be assembled and disassembled by hand comprising:
    a base with a flat back, and one or more of an adhesive strip runs from one side of the flat back to an opposite side of the flat back, putting a tab for the adhesive strip outside the outside edge of the hanger, and a set of grooves on a front side of the base with the flat back, wherein the adhesive strip is comprised of; a hook and loop strip with adhesive backings;
    a ball adapter reversibly connected to the base with a set of tabs built onto a bottom portion of the ball adapter configured to snap into the set of grooves on the front side of the base with the flat back, and having a ball connected to a post connected to a top portion of the ball adapter;
    a cradle mount with a set of extendable clamps configured to hold a skateboard in a ready to use state, and a socket on a rear surface for a reversible connection to the ball adapter; and
    a collet nut threaded onto the ball socket forming a surface to surface connection to the ball adapter to the cradle mount.

2. The hanging device of claim 1 wherein the ball adapter contains fittings such that the bottom portion of the ball adapter has a set of T-shaped tabs that connect with a pair of t-shaped shaped slots on the base and 2 sets of tabs aligned along the a edge of the ball adapter, and a set of transverse slots in the center of the ball adapter with a matching set on a front side of the base forming a locking attachment with the base.

3. The hanging device of claim 1 further comprising a modular component; a tilt lock with a set of tabs inserted into a complimentary set of slits on the top portion of the ball adapter offset from the post on the and the cradle mount rests on an opposite side of the tilt lock.

4. The hanging device of claim 3 wherein the tilt lock is a flexible metal with the set of tabs positioned slightly wider than a set of holes on the ball adapter unless inserted into the set of holes on an outside face of the ball adapter, wherein the force of the set of tabs on the tilt lock on the set of holes on the outside face of the ball adapter hold the tilt lock in place.

5. The hanging device of claim 1, wherein a second wall connector is selected from: a drywall hook passing through a hole in the base; a drywall anchor passing through a hole in the base; a screw passing through a hole in the base.

6. The hanging device of claim 1, wherein the cradle mount has a locking mechanism to hold the skateboard in place.

7. The hanging device of claim 2, wherein the locking mechanism on the base are configured to hold level indicators to aid in the placement of the hanging device.

8. A method of making a skateboard hanger comprising the steps of:
    construction of the hanging device for a skateboard of claim 1; and
    placement of the base with the flat back on a wall.

9. The method of claim 8 further comprising:
    placing a bubble level into the grooves on the front side of the base;
    aligning the base a level position;
    securing the base to a desired surface using the adhesive strip; and
    removing the bubble level prior to the step of, reversibly connecting the ball adapter to the base by snapping the tabs of the ball adapter into the grooves on the base.

10. The method of claim 8 further comprising:
    reversibly connecting a tilt lock with a set of tabs into a complimentary set of slits on the top portion of the ball adapter offset from the post; and
    resting the cradle mount on an opposite side of the tilt lock.

11. The method of claim 8 further comprising:
    placing the skateboard within the cradle mount.

12. The method of claim 10 further comprising:
    placing the skateboard within the cradle mount.

13. The method of claim 8 wherein the base with the flat back, the ball adapter, the cradle mount, and the collet nut are capable of being fitted together to form a skateboard hanger.

* * * * *